UNITED STATES PATENT OFFICE.

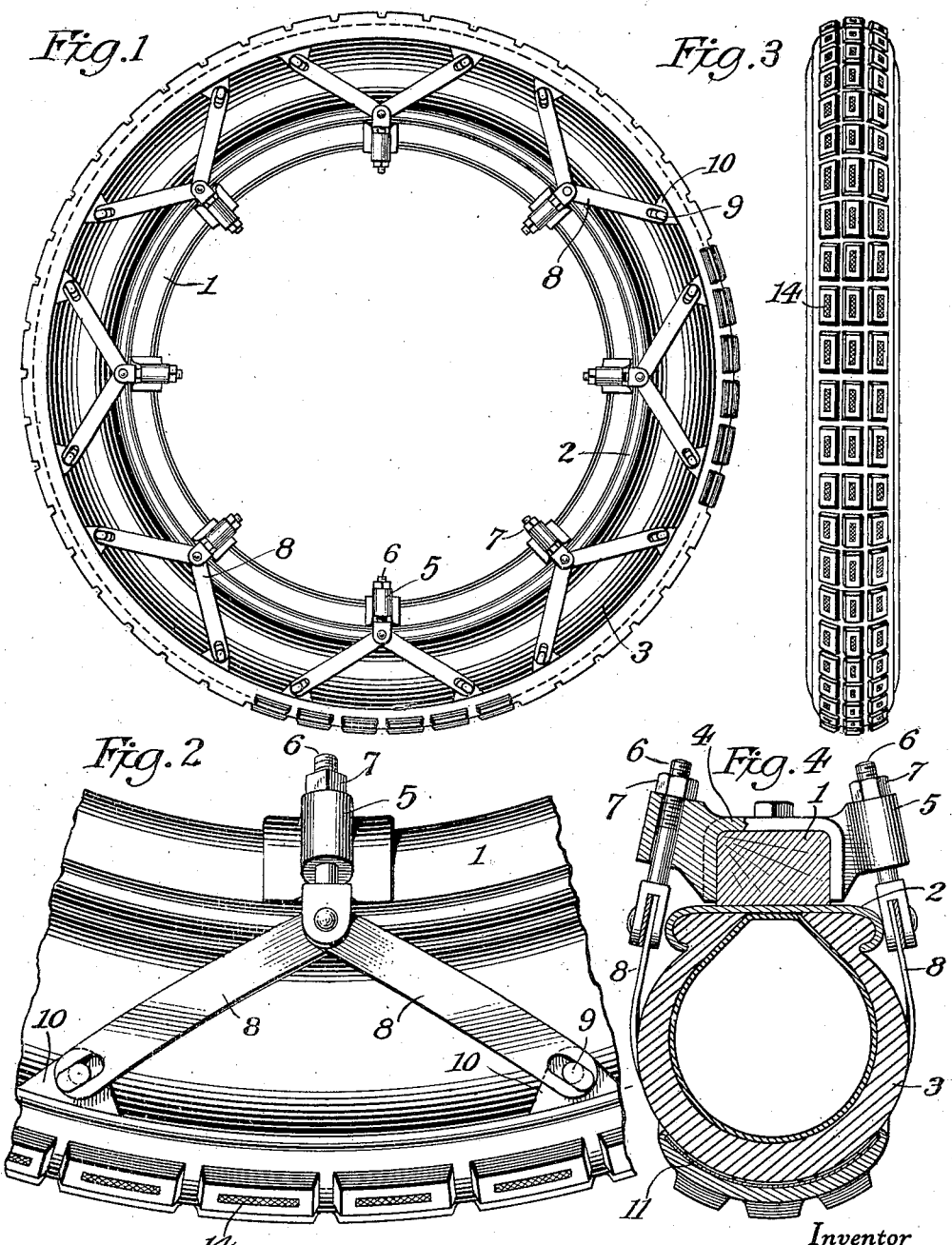

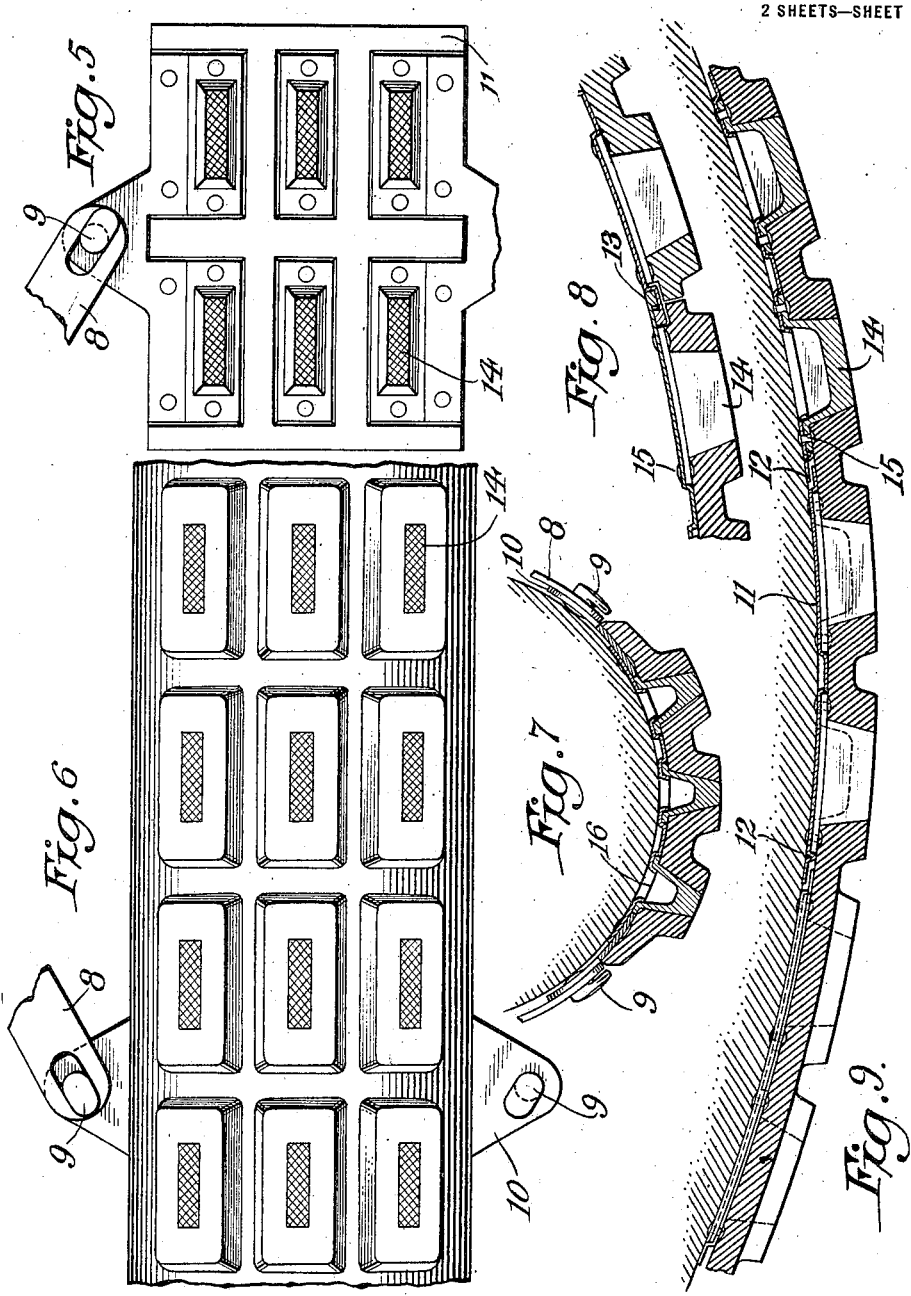

MARVIN C. ALTMAYER, OF NEW YORK, N. Y.

TIRE-PROTECTOR.

1,380,625.  Specification of Letters Patent.  Patented June 7, 1921.

Application filed June 4, 1919. Serial No. 301,716.

*To all whom it may concern:*

Be it known that I, MARVIN C. ALTMAYER, a citizen of the United States, residing at New York, in the county of New York and State of New York, have invented certain new and useful Improvements in Tire-Protectors, of which the following is a full, clear, and exact description.

In a Patent No. 1,307,531, granted to me on June 24, 1919, I have shown and claimed a novel form of protector or armor for the pneumatic tires of automobiles and other vehicles, and the present application is based upon an improvement on that invention. According to my present invention I provide a protector or armor for pneumatic tires, which is not only of new construction itself, but is held to the tire by novel means, and furnished with a non-puncturable, non-skidding surface which adds materially to its value and efficiency.

In the drawings hereto annexed, which illustrate my improvements in the most desirable and practicable form in which I embodied them—

Figure 1 is a view in elevation of a complete pneumatic tire mounted on a felly and equipped with my improved protective armor.

Fig. 2 is a similar view on an enlarged scale of one section of such tire.

Fig. 3 is an edge or tread view of the same.

Fig. 4 is a radial cross section of the tire and its felly.

Fig. 5 is an enlarged plan view of one link or section of the metallic portion of the protector.

Fig. 6 is a similar view of the remaining links of a tire section completed.

Fig. 7 is a sectional view of the protector.

Fig. 8 is a sectional view of a modification of the same on a plane at right angles to Fig. 7, and Fig. 9 is a longitudinal sectional view of my prefererd form of protector.

Similar letters of reference indicate corresponding parts in the several figures.

Referring to Fig. 4, the felly of the wheel, conventionally illustrated, is designated by the numeral 1, and to this is secured the usual rim 2 fitted with any desired form of pneumatic tire 3. These parts may be of any form, pattern and style and are shown as typical merely of such a combination.

To the felly 1 at given intervals, and I prefer to divide the entire wheel or tire into eight sections, are secured strong metal castings 4 having side lugs 5 with substantially radial holes, but inclined slightly outward, through which extend bolts 6 held in the holes in said lugs by screw nuts 7, or otherwise.

In the bifurcated ends of the bolts 6 are riveted or otherwise properly, securely and pivotally fastened flat metal links or bars 8 having slots near their free ends which engage with studs 9, set in turned over ears 10 secured to or integral with the end units or parts of the metal base for the protectors, three of which are preferably used in each of the eight sections above referred to. These ears are bent over so as to lie closely to the sides of the tire, and by reason of the special connection used the links have a sufficient play to compensate for the deformation of the tire as it runs over the surface of the road. Any excessive or unusual deformation will be compensated for by the bolts 6 moving toward the wheel center or axle through the holes in the lugs 5.

The units or divisions of the metal protector base are composed of overlapping metal sheets 11, suitably stamped as shown in Fig. 5. Preferably the edges of each metal sheet overlap as shown at 12 in Fig. 9, and in the modified form the edges of each third sheet or those between the sections not only overlap but interlock, as shown at 13 in Fig. 8.

Each unit or sheet 11 has preferably six metal blocks 14 spot welded or riveted to it, the drawings showing these blocks secured by means of rivets 15, and for practical reasons the under side of said blocks is hollowed out and lies over a perforation 16 in the metal sheet. The purpose in this is to secure ventilation and prevent any tendency to overheating of the protective cover, for as the tire runs over the slightest irregularities in the surface of the road, there is certain to be a slight play between the protector and the tire tread, which will draw in and expel air and thus tend to keep the metal blocks cool.

After the blocks are secured in place a covering of rubber is molded and vulcanized on the surface of the metal units and around but not over the tops of the metal blocks, which are therefore flush with the tops of the prominences made up of rubber and metal. The molded rubber serves the dual function of a tread and as an elastic connection between the different plates 11.

In practice it has been found that metal in a tire tread is worn down more rapidly than rubber, and hence all proposed forms of studs or the like to prevent skidding or resist punctures have heretofore proved of but little value, and are not, to my knowledge, in practical or commercial use to any appreciable extent.

In my improved device, however, the surface of the protector which comes in contact with the road bed differs in no essential respects in configuration from that employed in many commercial tires now in use. It is, however, far better adapted to prevent skidding by the presence of the metal blocks or elements, and heretofore, so far as I am aware, no practicable plan has been devised for incorporating such elements with a rubber tread.

These protectors may be readily and easily applied to any tire in sections, and they will prolong to a very great extent the life of a tire, they preserve their proper position, they wear at a very slow rate, they add comparatively little to the weight, and the additional expense involved in their use is much more than compensated for by the longer life which they give to the tires.

What I claim is:

1. A tire protector adapted to be secured over the tread of the tire composed of overlapping metal plates the lower surfaces of which abut against the tire tread in combination with metal blocks secured thereto and a coating of rubber vulcanized onto the surface of plates and around the sides of the blocks.

2. A tire protector adapted to be secured over the tread of a tire composed of overlapping metal plates the lower surfaces of which abut against the tire tread, in combination with recessed metal blocks or projections secured thereto over holes in the plates, and a coating of rubber vulcanized to the exposed surface of the plates and sides of the blocks.

3. The combination with a pneumatic tire, of a protector for and secured over the tread of the same, comprising a series of metal sheets, each sheet at its lateral ends overlapping the adjacent sheets, rows of metal blocks secured to the sheets, a covering of rubber vulcanized to the metal sheets and the rider only of the metal blocks, said rubber forming with the blocks a tread for the protector and of itself providing the sole connection between the individual sheets, said overlapping of the sheets and elastic connection by the rubber permitting the parts of the protector to move relatively to each other on the deformation of the tire.

4. The combination with a pneumatic tire, of a protector for and secured over the tread of the same, comprising a series of overlapping metal sheets, rows of hollow metal blocks secured over perforations in the metal sheets, and a covering of rubber vulcanized to the exposed surfaces of the metal sheets and the sides of the metal blocks to form a non-puncturable non-skidding tire surface, said rubber being also adapted to form an elastic connection between the adjacent metal sheets.

5. A tire protector adapted to be secured over the tread of a tire composed of overlapping metal plates, in combination with hollow metal blocks secured over holes in the plates, a coating of rubber vulcanized to the exposed surface of the plates and the sides of the blocks, said hollow portions of the blocks and holes in the plates forming an air cooling void in the protector adapted to cool the plates and blocks.

In testimony whereof I hereunto affix my signature.

MARVIN C. ALTMAYER.